June 11, 1935.   H. E. TAUTZ   2,004,678
SCROLL SAW CHUCK
Original Filed June 7, 1933
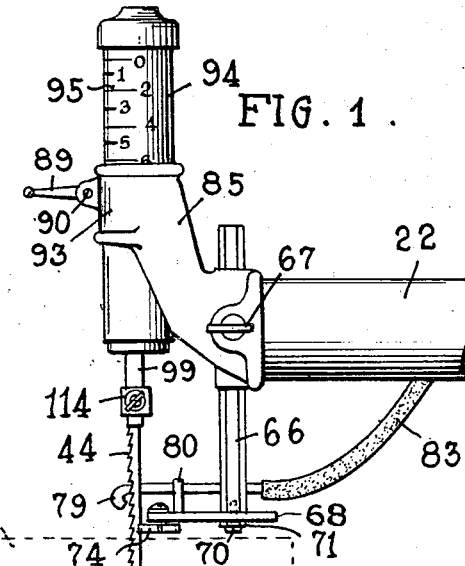
FIG. 1.
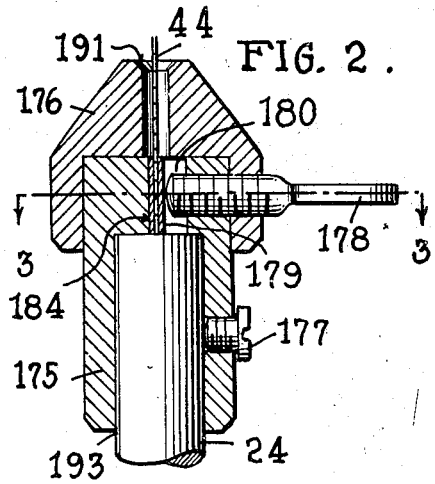
FIG. 2.
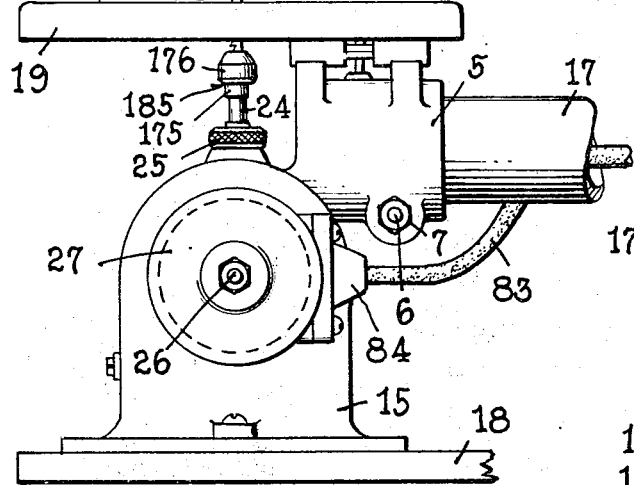
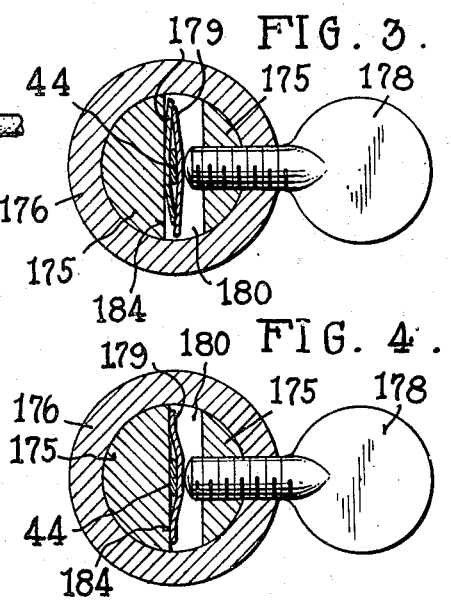
FIG. 3.
FIG. 4.
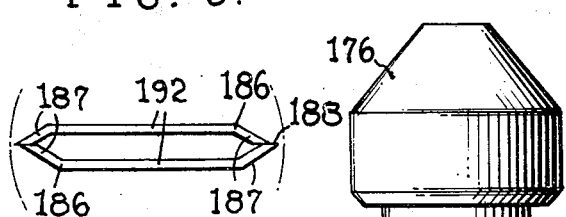
FIG. 6.   FIG. 5.
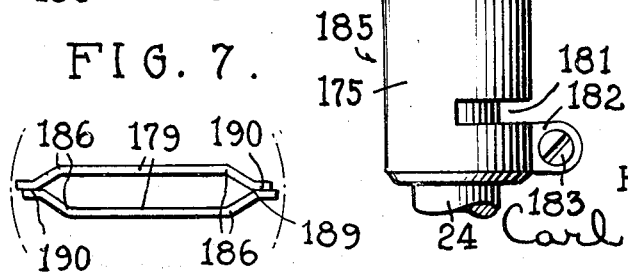
FIG. 7.
*INVENTOR*
HERBERT E. TAUTZ.
Carl A. Hellmann
*ATTORNEY*

Patented June 11, 1935

2,004,678

UNITED STATES PATENT OFFICE 2,004,678

SCROLL SAW CHUCK

Herbert E. Tautz, Milwaukee, Wis., assignor to Delta Manufacturing Company, Milwaukee, Wis.

Original application June 7, 1933, Serial No. 674,748, now Patent No. 1,984,500, dated December 18, 1934. Divided and this application October 9, 1933, Serial No. 692,869

11 Claims. (Cl. 279—44)

This invention relates to scroll saws.

More specifically it relates to improvements in the structure of the chucks of scroll saws, particularly adapted to cooperate with scroll saws of the type disclosed in the co-pending application Serial No. 669,587, filed May 5, 1933, although also of general application to other scroll saws and similar tools. This case is a division of the co-pending application Serial No. 674,748, filed June 7, 1933.

Still more specifically a feature of the present invention relates to a chuck particularly adapted for holding reciprocating tools, such as saw blades and the like.

A further object of the invention is to provide a tool-holding device or saw-chuck of this nature which, while extremely light in weight and simple in construction, is yet very rigid and rugged and will firmly hold any saws or the like clamped therein.

A further object is to provide a device of this general nature having two jaws, one of which is movable with respect to the other and is securely held against loss by being partly enclosed by the other.

Another object is to provide improved, simple and inexpensive means for securely but removably attaching the chuck to a reciprocating plunger of a scroll saw or the like.

Other objects and advantages of my invention will be evident from the various features set forth in the present specification and defined in the claims appended thereto.

For a clear understanding of the invention reference is to be had to the accompanying drawing, illustrative of several embodiments thereof.

In said drawing:

Fig. 1 is a side elevation of a portion of a scroll saw embodying two forms of the improved chuck, cooperating therewith, to illustrate how the chucks are used in practice, preferably applied to a scroll saw, Fig. 2 is a central vertical longitudinal section through the lower chuck illustrated in Fig. 1, Fig. 3 is a horizontal section through the chuck illustrated in Fig. 2, on the plane indicated by the line 3—3, Fig. 4 is a cross section of a slightly modified form of chuck, but which in general is similar to the form indicated in Figs. 2 and 3, Fig. 5 is an elevation of a chuck similar to that of Figs. 2 to 4, but having modified means for securing it to the operating plunger of the scroll saw, Fig. 6 illustrates diagrammatically certain features connected with the spring jaws of one form of chuck, and Fig. 7 likewise diagrammatically shows a slightly different type of spring jaws.

In the various figures similar parts are designated by the same reference characters.

Referring first to Fig. 1, there is illustrated a scroll saw embodying certain features of the invention, together with features of the older form of scroll saw, in order to show how the invention is to be used. In this figure, 15 designates a main drive housing which is fixedly secured to a suitable rear support or standard by means of the tubular arm 17, the housing 15 and the rear support being preferably mountable upon a suitable base, such as 18.

A work table 19 is secured to the drive housing 15 and is mounted to tilt thereon about an axis lying preferably in the upper surface of the table and in line with the saw blade. The work table is provided with a suitable opening for the passage of the saw blade, and with means for securing the said table in any desired adjusted position about its axis.

The housing or crank case 15 contains suitable operating mechanism for reciprocating the lower plunger 24 which is mounted slidably in the bushing 25 secured to the housing. The power for operating the said plunger is transmitted thereto through the crank shaft 26 by means of the pulley 27 which may be rotated by any suitable motor or other source of power. A suitable chuck designated generally as 185 cooperates with the plunger 24 to hold the lower end of a saw blade 44 in order to reciprocate said saw blade through the table.

An air pump 84 is also secured to the housing 15 and actuated by said shaft 26 to provide an air blast which passes through the flexible tube 83 into the tubular arm 17, said tube passing thence upward through the rear standard and back into the upper tubular arm 22, and finally terminating in a nozzle tube 79 adjustably secured in a support 80, to blow away the sawdust from the upper surface of the workpiece 78 resting upon the table 19.

The lower tubular member 17 may be secured to the housing 15 in any desired way, for example by being mounted in a suitable lug 5 secured to the housing 15 and split longitudinally at its lower part, in cooperation with a bolt 6 and nut 7 which will clamp the split lug 5 closely against the member 17. The tubular members 17 and 22 are secured to the rear standard in any desired manner, as shown for instance in the prior Patent No. 1,877,705.

A preferably polygonal rod 66, in the present case shown as hexagonal in cross section, has a bar 68 adjustably secured to its lower end, for example, by means of a bolt 70, a washer 71 being interposed between the bar and the head of the bolt. The support 80 for the nozzle 79 is also secured to this bar 68 in any desired manner and said bar 68 likewise supports adjustably the rotatable head 74 which has a series of slots at its periphery adapted to receive saw blades 44 of varying thicknesses and widths. All the features so far described are old and are already disclosed in the prior patent, above mentioned, and are described herein merely to illustrate how the improved features cooperate with the old structure.

Referring now to the head designated by reference character 85, in Fig. 1, it will be noted that this head takes the place of the head 23 disclosed in the prior patent, and is secured rigidly in position and in alinement by means of a rod 1 secured thereto, said rod extending through the tubular member 22 and being rigidly secured to the other end of said member and to the rear standard. The rod 66, already mentioned, passes through a suitably formed guideway in the head 85 and is secured at any desired elevation by means of the thumb screw or the like 67, shown in Fig. 1. It will be noted that the head 85 differs from the head 23 of the prior patent in that instead of extending in a generally horizontal direction as a continuation of the tube 22 it extends upward above said tube, as clearly shown in Fig. 1. It differs also from the former construction in that it is preferably split in front, and a bolt 90, having an operating lever 89 secured thereto, is threaded into one portion of said split part, while it passes freely through the other part so that the two parts may be drawn together or again released by proper manipulation of the arm 89. The tubular housing 94 contains a spring or other means for returning the plunger of the saw on its up stroke and a scale 95 for indicating the position of the housing and thereby the tension of the said spring. These features are disclosed and claimed in the copending application filed May 5, 1933, Serial No. 669,587, for Scroll saws, form no part of the present invention, and are mentioned herein only to complete the disclosure.

In the parent case, application Serial No. 674,748, are claimed the structures relating to various forms of the upper chuck designated generally by the reference character 114 in Fig. 1 and such structures are particularly suitable for the upper chuck of a scroll saw or the like, for the reason that they are relatively simple, rugged, and inexpensive and may be made extremely light in weight, which is a highly desirable feature in a chuck which is moved entirely by power transmitted through the saw blade 44, especially when the speed of reciprocation is high and when the blade 44 is very delicate.

The chucks illustrated in Figs. 2 to 7 inclusive, of the present case, and which are specifically claimed herein, on the other hand, are primarily intended to be employed on the lower or directly driven plunger 24 of the scroll saw, that is, these chucks are driven directly by the source of motive power through the mechanism contained in the crank case 15, of Fig. 1, and, therefore, it is not so important to make these of light weight, because no increased danger and strains in the saw blade 44 will be produced by an increase of weight of the said lower chuck. However, it should be clearly understood that while certain chucks are herein described as preferable for the upper plunger and certain others for the lower plunger, the utility of these chucks is not actually so limited and any of these chucks may be used interchangeably upon either plunger if preferred, or if found expedient in any particular case.

Referring to the chuck illustrated in Figs. 2 and 3 it will be noted that this chuck comprises a tubular shank 175 suitably bored at 193 to admit into its interior the plunger 24, and having a screw or other suitable securing means 177 threaded through said tubular shank 175 and engaging the plunger 24 to removably secure said parts to one another.

At the upper portion of this member 175, I provide a slot 180, one surface 184 of which is substantially diametrally arranged, whereas the other side of the slot is displaced a considerable distance from the said diameter or central line. A preferably conical head 176 may be engaged over the upper end of the member 175, preferably by merely sliding it over the same and said parts 175 and 176 will be held in engagement by means of a thumb screw 178, passing through both and threaded into one of them. The conical head 176 has a bore or slot 191 provided therein to allow the saw blade 44 to pass through the said head and be engaged between two resilient elements 179. Both of these resilient members 179 are given a permanent set into substantially a bowed form, as best shown in Fig. 3, wherein, however, the degree of bowing is less than the maximum, because of the fact that the thumb screw 178 is there shown as clamping the saw blade 44 between the two spring jaws 179. Upon releasing the thumb screw 178, these jaws 179 will spring apart sufficiently to release the blade 44 which may then readily be withdrawn through the bore 191 in the head 176.

The form of chuck illustrated in Fig. 4 differs from that illustrated in Figs. 2 and 3, solely in providing a single bowed spring 179 instead of two such springs, and the saw blade is in that case clamped between one surface 184 of the slot 180 and the inner side of the single spring 179.

The form shown in Fig. 5 may have the internal structure shown in Fig. 2 and either Fig. 3 or Fig. 4, and in other respects differs from the Fig. 2 form only in the clamping means for securing the member 175 to the plunger 24. In the Fig. 5 form a slot 181 may be cut transversely, about halfway through the tubular member 175 and the portion below said slot may be provided with ears 182, parallel to and slightly spaced from one another, one of said ears 182 having an internal thread therein which is engaged by the screw 183 which passes freely through the other ear. Upon approaching the two ears 182 to one another by tightening the screw 183, it is obvious that the tubular member 175 will be securely clamped to the plunger 24.

A general difference between the chucks claimed in the parent case and illustrated in Figures 2 to 9 thereof, on the one hand, and those disclosed and claimed in Figs. 2 to 7 of the present case, on the other hand, is that the former type of chuck is shown as adapted to a tubular plunger and the latter type to a solid plunger, in the forms specifically illustrated. However, it is obvious that this is not an essential or important feature and that either type of chuck can readily be adapted to either the solid or hollow type of plunger by relatively immaterial changes and, therefore, no limitation of either type of chuck to the specific form shown is to be implied by the said specific illustrations.

Referring now to Fig. 6 there is shown diagrammatically one type of spring which may be used in the chuck. In this figure there are shown two identical springs 192, 192 in the position which they would assume, for example, if used in the chuck shown in Fig. 3. It will be noted that each of these springs, here shown, of course, in grossly exaggerated thickness for clearness of illustration, is bent at 186 to form a relatively short portion 187 at each end, serving to space the two springs 192, 192 apart from one another, as shown, when they are assembled with the ends 188 of the short sections 187 in contact with one another. The end faces 188 of these springs 192 may be cut at a slant to the remainder of the portions 187, so that the meeting surfaces 188 may be substantially parallel to the major portions of the springs, as illustrated. In such case due to this parallelism there will be no tendency for one spring to slip off from the other. The dot and dash lines, forming circular arcs around the ends of the springs 192 of Fig. 6, designate, on a very much enlarged scale, the inner bore of the member 176, Fig. 2, and illustrate how the springs are positively kept from slipping off from one another at their ends due to proper choice of their size with respect to the said bore. This slanting of the ends 188 may in certain cases be found unnecessary, if the springs are fitted closely enough within the bores to prevent such sidewise slip and disengagement. The same effect may be secured by providing springs such as shown in Fig. 7. In this case the springs 179 have additional bends at their ends, that is, they are bent at 186, just as are the springs of Fig. 6, but bent again at 189 in the opposite direction, thus producing ends 190, which are parallel to the major portions of the springs. Here again the surfaces of contact are in a plane parallel to the major portions of the springs 179, 179 and, therefore, there is no tendency for one to slip off of the other. It will be clearly understood, however, that these special shapes of springs are refinements which may be found unnecessary in many cases and, therefore, the springs actually used in the chucks need not in all cases be made as elaborately as those just described and any spring having a slight bow of sufficient amount at the central portion may in many cases be found satisfactory regardless of the actual shape of the said bow and whether or not it is made of straight or curved portions.

The operation of the various types of chucks is as follows:

The operation of the forms of chucks illustrated in Figs. 2, 3 and 4, will be clear from the illustrations. These chucks, whether they have a single spring jaw 179 or a pair of spring jaws 179, 179, as shown specifically in the cross sections, operate in substantially the same way as the form described in Figs. 5 and 6 of the parent case.

Briefly, the thumb screw 178 is screwed out sufficiently to leave a gap of suitable size, between the jaws 179, 179 of Figs. 2 and 3, to receive the end of the saw blade 44 when said blade is inserted through the slot or aperture 191. Owing to the resiliency of the spring jaws 179, 179 and owing to their normal permanent set in bowed shape, these springs will automatically separate when the thumb screw 178 is unscrewed and the aperture 191 will automatically guide the end of the saw blade 44 into proper position between said two spring jaws. When thus positioned it is necessary merely to again tighten the thumb screw 178, in order to clamp the said end of the saw blade 44 between the jaws, thus producing the condition actually illustrated in Figs. 2 and 3.

Referring now specifically to Fig. 4, it will be noted that the operation of the modified form shown in this figure is substantially identical with that of the form shown in Figs. 2 and 3. Here, when the thumb screw 178 is unscrewed sufficiently, the single spring jaw 179 will bow outwardly to an extent sufficient to admit the saw blade 44 freely between itself and the stationary surface 184 forming a wall of the slot 180. Here again the saw blade is inserted and guided through the aperture 191 of the head 176, until it is in proper position between the movable jaw 179 and the stationary or fixed jaw having the surface 184 thereon and the blade is then secured in such position by tightening the thumb screw 178.

It is obvious that a rigid jaw, such as the jaw 118 or 168, for example, of the parent case, may be employed in place of the spring jaw 179, shown in Fig. 4 of the present case.

The tubular portion 175 of the chuck will fit over the end of the plunger 24, as shown in Figs. 1 and 2, to secure the chuck in proper position and the chuck may then be tightened in such position by means of the screw 177 threaded through the tubular portion 175 and engaging against or even into the plunger 24.

The operation of the Fig. 5 form of chuck is identical with that of the Figs. 2, 3 and 4 form as to all the internal structure of the chuck proper and the only difference between this form and the other said forms resides in substituting the slotted portion 181 and the ears 182, 182 of the Fig. 5 form, together with the screw 183, in place of the screw 177 of the Fig. 2 form. This is a construction which may be found preferable in certain cases and which provides a very firm grip of the tubular member 175 upon the reciprocating plunger 24.

Inasmuch as the lowness of weight or inertia of the lower plunger and lower chuck carried thereby, is not of an extreme importance as the corresponding weight of the upper chuck and plunger, for the reason that the lower members are moved directly and positively by the motor driven operating mechanism in the crank case 15, this lower chuck and the plunger 24 may be made wholly of steel, in contradistinction to the upper chuck which is preferably made of suitable light metal. However, if for any reason the same structure as that of Figs. 2–5, is to be used for an upper chuck, this may be done by making all the massive parts thereof of light metal instead of using steel and conversely if it is desired to employ the structural details of the chucks shown in Figs. 2–9 inclusive of the parent case, in lower chucks instead of upper ones the inverse change may be made, if desired, that is, steel or other suitable heavy metal may be substituted for the light metal originally disclosed for use in the upper assembly. The governing principle, of course, is that inasmuch as the upper chuck and plunger are actuated entirely by forces transmitted through the saw blade 44, and said saw blade 44 is in many cases very delicate, the said blade will be unduly strained and prone to premature breakage if the mass, and consequently inertia, of the parts actuated thereby are excessive in proportion to the strength of the said saw blade.

Having described the invention and disclosed several modifications thereof, it will be understood that the inventive ideas may be embodied in still further modifications besides those disclosed herein and, therefore, for an understanding of the invention reference is to be had to the following claims.

What is claimed is:

1. A saw-holding chuck for a scroll saw comprising a tubular member having a non-tubular cylindrical end portion with a substantially longitudinal slot therein and open at said end thereof, a head fitting over said cylindrical end of the tubular member and having an axial bore, a screw passing through a portion of the head and a portion of the non-tubular cylindrical end of the tube and threaded through one of said members and a resilient chuck jaw arranged within said slot to cooperate with said screw, whereby a saw blade may be clamped between one surface of the said slot and the said resilient jaw.

2. A saw-holding chuck for a scroll saw comprising a tubular member having a non-tubular cylindrical end portion with a substantially longitudinal slot therein and open at said end thereof, a head fitting over said cylindrical end of the tubular member and having an axial bore, a screw passing through a portion of the head and a portion of the non-tubular cylindrical end of the tube and threaded through one of said members and a resilient chuck jaw arranged within said slot to cooperate with said screw, whereby a saw blade may be clamped between one surface of the said slot and the said resilient jaw, said tubular member having means for securing it to a suitable operating member.

3. A saw-holding chuck for a scroll saw, comprising a shank, means for securing said shank to a suitable operating member, said shank having a longitudinal slot at one end thereof, said slot being substantially diametral in location and open at both peripheral portions, resilient chuck jaws arranged in said slot, means for preventing said chuck jaws from being removed bodily from the said slot and adjustable means for forcing said jaws against one another to hold the saw blade between them.

4. A saw-holding chuck for a scroll saw, comprising a tubular member, a head fitting over one end of the tubular member and having a longitudinal bore, a screw passing through a portion of the head and a portion of the tube and threaded into one of said members, and chuck jaws arranged within said head to cooperate with said screw, whereby a saw blade may be clamped between said jaws, said tubular member having means for securing it to a suitable operating member.

5. A saw-holding chuck for a scroll saw, comprising a member having a tubular portion at one end and having a slot at the other end, said last named end being cylindrical and the slot being located substantially diametrically thereof and extending entirely across the same, a jaw fitting within the slot, a head for said member, and a single means for securing the head to the cylindrical portion of the member and for forcing said jaw against one surface of the slot.

6. A saw-holding chuck for a scroll saw, comprising a member having a tubular portion at one end and having a cylindrical portion with a substantially diametrically located slot at the other end, said slot extending entirely across the cylindrical portion, a jaw fitting within the slot, a head for said member, and a single screw for securing the head to the cylindrical portion of the member and for actuating said jaw.

7. A chuck for cooperating with a reciprocating operating means, for holding reciprocating tools, said chuck comprising a body member securable to the said operating means, said member having a longitudinal slot in one end thereof, one boundary of said slot being a substantially axially located plane surface, and constituting a relatively fixed abutment for the tools, a relatively movable jaw, said jaw being freely movable in said slot, a head fitting over the slotted end of the said body member, and preventing said jaw from leaving the slot and a single means for securing the head to the body member and for operating the jaw.

8. A saw-holding chuck for a scroll saw comprising a tubular member having a substantially longitudinal slot therein adjacent one end thereof, said slot extending entirely across the member, a head fitting over said end of the tubular member and having an axial bore, said head thus closing the end of the slot, a screw passing through a portion of the head and a portion of the tube and threaded through one of said members and a rigid chuck jaw arranged within said slot to cooperate with said screw, whereby a saw blade may be clamped between one surface of the said slot and the said rigid jaw, said jaw being retained within said slot by said head.

9. A chuck for cooperating with a reciprocating operating means, for holding reciprocating tools, said chuck comprising a cylindrical body member securable to the said operating means, said member having a longitudinal slot extending substantially diametrically across one end thereof, one boundary of said slot being a substantially plane surface, and constituting a relatively fixed abutment, a pair of resilient, bowed, movable jaws, said jaws being freely movable in said slot, a head fitting over the slotted end of the said body member and retaining the said jaws therein, and a single screw threaded means for securing the head to the body member and for moving the jaws relatively to one another by forcing them against said fixed abutment.

10. A saw-holding chuck for a scroll saw, comprising a shank having a cylindrical portion at one end, means for securing said shank to a suitable operating member, said cylindrical portion having a longitudinal slot at one end thereof, said slot being substantially diametral in location and open at both peripheral portions, resilient chuck jaws arranged in said slot, means surrounding said cylindrical portion and closing said open ends of the slot for preventing said chuck jaws from being removed bodily from the said slot and adjustable means for forcing said jaws against one another to hold the saw blade between them.

11. A saw-holding chuck for a scroll saw, comprising a shank, means for securing said shank to a suitable operating member, said shank having a longitudinal slot at one end thereof, said slot being substantially diametral in location and open at both peripheral portions, a resilient chuck jaw arranged in said slot, means for preventing said chuck jaw from being removed bodily from the said slot and adjustable means for forcing said jaw toward one wall of the slot to hold the saw blade between said wall and said jaw.

HERBERT E. TAUTZ.